United States Patent
Minehan

(10) Patent No.: US 11,695,752 B2
(45) Date of Patent: Jul. 4, 2023

(54) WORK PROVENANCE IN COMPUTING POOLS

(71) Applicant: CORE SCIENTIFIC, INC., Bellevue, WA (US)

(72) Inventor: Kristy-Leigh Anne Minehan, Bellevue, WA (US)

(73) Assignee: CORE SCIENTIFIC OPERATING COMPANY, Bellevue, WA (US)

( * ) Notice: Subject to any disclaimer, the term of this patent is extended or adjusted under 35 U.S.C. 154(b) by 225 days.

(21) Appl. No.: 16/900,860

(22) Filed: Jun. 12, 2020

(65) Prior Publication Data

US 2020/0403984 A1    Dec. 24, 2020

Related U.S. Application Data

(60) Provisional application No. 63/025,866, filed on May 15, 2020, provisional application No. 62/863,209, filed on Jun. 18, 2019.

(51) Int. Cl.
  *H04L 9/40* (2022.01)
  *G06F 9/50* (2006.01)
  *H04L 9/30* (2006.01)
  *H04L 9/32* (2006.01)

(52) U.S. Cl.
  CPC .......... *H04L 63/083* (2013.01); *G06F 9/5011* (2013.01); *H04L 9/30* (2013.01); *H04L 9/3247* (2013.01)

(58) Field of Classification Search
  None
  See application file for complete search history.

(56) References Cited

U.S. PATENT DOCUMENTS

| 10,762,506 B1* | 9/2020 | Cash ..................... G06Q 20/206 |
| 2019/0180237 A1* | 6/2019 | Mattingly ................. H04L 9/50 |
| 2019/0220836 A1* | 7/2019 | Caldwell .......... G06Q 20/38215 |
| 2020/0175503 A1* | 6/2020 | Sarin ..................... H04L 9/3239 |
| 2021/0097532 A1* | 4/2021 | Mahasuverachai .. G06Q 20/401 |

OTHER PUBLICATIONS

Kaur, R. and Kaur, A., Sep. 2012. Digital signature. In 2012 International Conference on Computing Sciences (pp. 295-301). IEEE. (Year: 2012).*

(Continued)

*Primary Examiner* — Luu T Pham
*Assistant Examiner* — Edward X Long
(74) *Attorney, Agent, or Firm* — Fishman Stewart PLLC

(57) ABSTRACT

A system and method for participating in and operating a distributed computing pool are disclosed. Computing pools combine computational resources from a plurality of computing devices over a network by splitting jobs into smaller jobs and distributing those smaller jobs to the computing devices so that they can be solved in parallel with little or no overlap in the work performed. The computing devices attempt to find solutions to the smaller jobs. Solutions found are signed and submitted back to the pool. The pool uses the signature to confirm the true origin of the solution and that the solution has not been tampered with.

17 Claims, 5 Drawing Sheets

(56) References Cited

OTHER PUBLICATIONS

Lin, et al., Aug. 2018. A sustainable reward mechanism for block mining in pow-based blockchain. In 2018 5th International Conference on Information, Cybernetics, and Computational Social Systems (ICCSS) (pp. 156-161). IEEE. (Year: 2018).*
Saleh, F., 2021. Blockchain without waste: Proof-of-stake. The Review of financial studies, 34(3), pp. 1156-1190. (Year: 2021).*
Recabarren, Ruben, et al. "Hardening Stratum, the Bitcoin Pool Mining Protocol" Proceeding on Privacy Enhancing Technologies. pp. 1-18. Mar. 20, 2017.
"In-depth analysis on Stratum Protocol and its known vulnerabilities"; https://medium.com/novamining/in-depth-analysis-on-stratum-protocol-and-its-known-vulnerabilities-3ef139495608; Apr. 4, 2018; accessed on Jun. 3, 2022.
Moravec, Pavel et al. "STRATUM V2: The next generation protocol for pooled mining"; https://braiins.com/stratum-v2; Nov. 13, 2019; accessed on Jun. 3, 2022.
Lanfranchi, Andrea et al. "EIP-1571: EthereumStratum/2.0.0"; https://eips.ethereum.org/EIPS/eip-1571; Nov. 9, 2018; accessed on Jun. 3, 2022.

* cited by examiner

WORK PROVENANCE IN COMPUTING POOLS

CROSS-REFERENCE TO RELATED APPLICATIONS

This application claims priority to U.S. Provisional Patent Application Ser. No. 62/863,209, filed on Jun. 18, 2019, titled "BLOCKCHAIN SYSTEM", and U.S. Provisional Patent Application Ser. No. 63/025,866, filed on May 15, 2020, titled "WORK PROVENANCE IN COMPUTING POOLS", the contents of which are hereby incorporated by reference in their entirety.

TECHNICAL FIELD

The present disclosure generally relates to the field of computing and, more particularly, to systems and methods for establishing provenance of submitted work items in distributed computing pools.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Many cryptocurrencies (e.g., Bitcoin, Litecoin) are based on a technology called blockchain, in which transactions are combined into blocks. These blocks are stored with previous blocks of earlier transactions into a ledger (the "blockchain") and rendered immutable (i.e., practically unmodifiable) by including a hash. The hash is a number that is calculated based on the blocks and that meets the blockchain's particular criteria. Once the block and hash are confirmed by the cryptocurrency network, they are added to the blockchain. The hashes can be used to verify whether any of the prior transactions or blocks on the blockchain have been changed or tampered with. This creates an immutable ledger of transactions and allows the cryptocurrency network to guard against someone trying to double spend a digital coin.

Many cryptocurrency networks consist of a large number of participants that repeatedly attempt to be the first to calculate a hash meeting the blockchain network's requirements. They receive a reward (e.g., a coin reward or transaction fee reward) that motivates them to continue participating (mining).

Many blockchain networks require computationally difficult problems to be solved as part of the hash calculation. The difficult problem requires a solution that is a piece of data which is difficult (costly, time-consuming) to produce, but is easy for others to verify and which satisfies certain requirements. This is often called "proof of work". A proof of work (PoW) system (or protocol, or function) is a consensus mechanism. It deters denial of service attacks and other service abuses such as spam on a network by requiring some work from the service requester, usually meaning processing time by a computer.

Participants in the network operate standard PCs, servers, or specialized computing devices called mining rigs or miners. Because of the difficulty involved and the amount of computation required, the miners are typically configured with specialized components that improve the speed at which hashes or other calculations required for the blockchain network are performed. Examples of specialized components include application specific integrated circuits (ASICs), field programmable gate arrays (FPGAs), graphics processing units (GPUs) and accelerated processing unit (APUs).

Many participants in blockchain networks participate via computing pools (often called mining pools). One reason for this is that the probability of an individual computing device solving a particular computational problem first (required to the solve the block and win the reward) is small. By pooling resources and splitting any received rewards, computing pools allow blockchain network participants (e.g., miners) to participate and secure rewards even if they are unlikely to individually find the solution. This feature has made computing pools quite popular in recent years, with a significant percentage of many blockchain's computing or hash power coming from such pools.

The pools are typically operated on one or more servers with one or more network connections that are used to communicate with pool participants. The server divides and distributes the computation problem (e.g., finding a nonce that results in a hash below a target value) to the pool participants in a way that allows them to work on the problem in parallel without duplicating efforts. This can be done by assigning each pool participant a different set of nonces to check. Nonces are used in proof-of-work systems to vary the input to a cryptographic hash function so as to obtain a hash for a certain input that fulfills certain arbitrary conditions, such as being below a predetermined value in order to satisfy a target difficulty value for the blockchain network.

One drawback to participating in mining pools is that there is the potential for a bad actor to interrupt or intercept communication between the computing device and the server operating the pool (e.g., man in the middle attack) and attempt to steal the benefit or rewards from the work performed by the computing device. Such attackers may be able to disrupt or steal valid submissions from a computing device.

For at least these reasons, there is a desire for a method for establishing the provenance of shares submitted to computing pools.

SUMMARY

A system and method for participating in a computing pool is disclosed. Computing pools combine computational resources from a plurality of computing devices over a network by splitting and distributing jobs to the computing devices so that they can be solved in parallel with little or no overlap in the work performed. In one embodiment, the method comprises authenticating a computing device by sending a username, a password, and a public key to the pool via the network. The public key corresponds to a private key associated with the computing device being authenticated. A connection request is then sent from the computing device to the pool, and the computing device receives a response from the pool that includes a job. The pool waits while the computing device executes the job and attempts to find an acceptable solution (e.g., a nonce or nonce combination that results in a hash that meets the pool's criteria such as a specified minimum difficulty). Once a solution is found, the computing device signs the solution (also called a share) with a signature based on the private key and then sends the signed solution to the pool. The pool verifies whether the solution meets the pools criteria (e.g., minimum difficulty) and whether the solution's signature corresponds to the public key for the computing device that submitted the solution. This confirms the provenance or true origin of the solution and can also confirm that the solution has not been tampered with. The pool determines whether the solution solves a block, and if it does the pool submits the solution to one or more blockchain nodes. The pool divides and allocates any rewards the pool receives for solving the block amongst the computing devices that submitted valid solutions for the block.

The pool can be configured to communicate with many computing devices, and in response to a computing device submitting an unsigned share, the pool may be configured to either (i) send a share rejected notification to the computing device, or (ii) accept the share at a reduced value (i.e., resulting in a lower reward if the pool received a reward).

In some embodiments, the computing device may create an SSL/TLS connection with the pool to further increase security (e.g., during authentication). The computing device may receive rewards from the pool in response to submitting valid signed solutions and the pool being the first to submit a valid solution to a blockchain network.

In some embodiments the reward is distributed proportionally according to the number of shares submitted by each computing device for the solved block. In other embodiments, the reward is distributed proportionally to the number of shares submitted out of the last N verified shares received by the pool.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
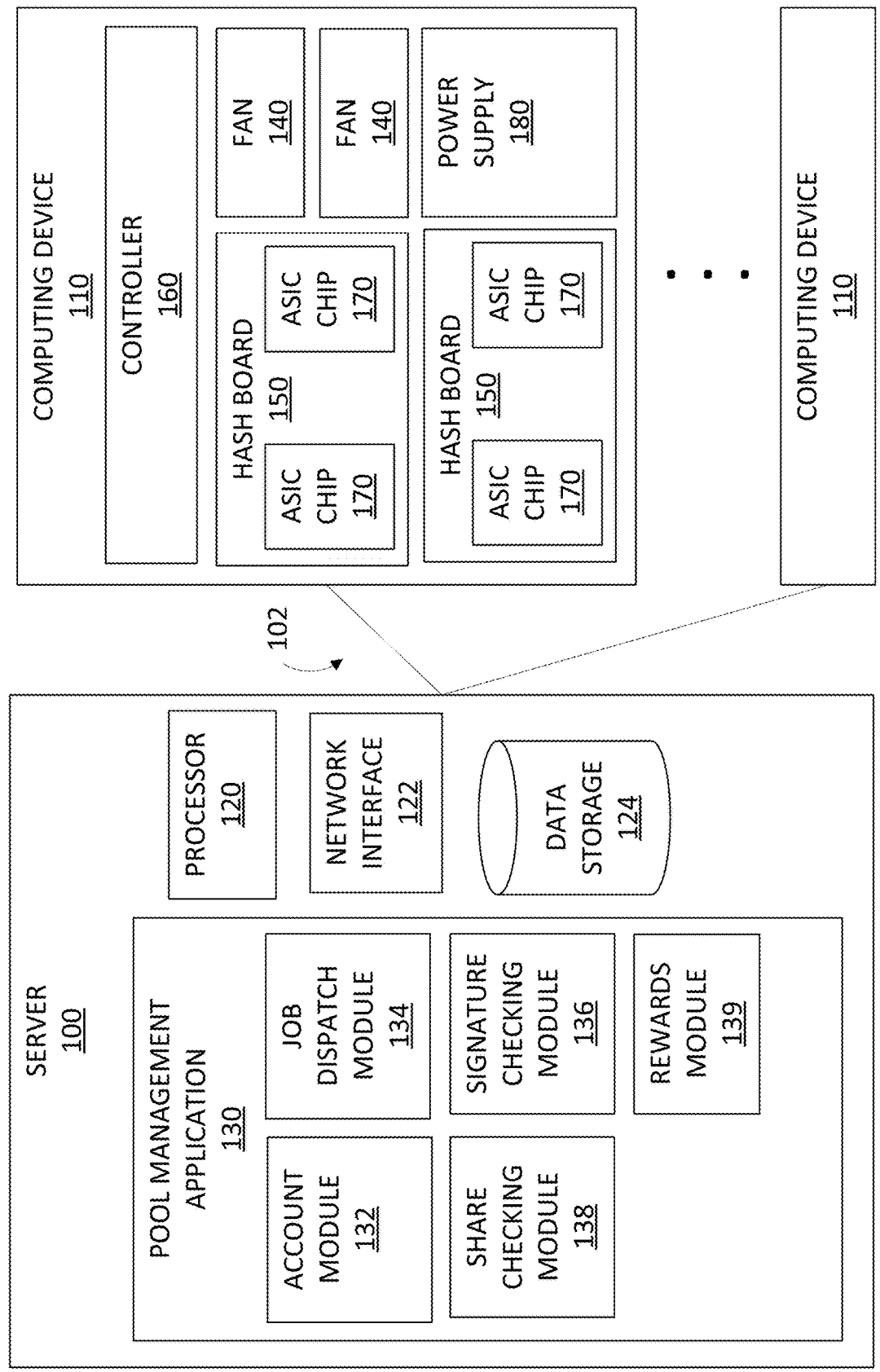
FIG. 1 is an illustration of an example embodiment of a system for operating a distributed computing pool is shown.

Turning now to FIG. 1, an illustration of an example embodiment of a computing system for operating a distributed computing pool and processing proof of work-based blockchain transactions is shown. In this embodiment, the system comprises at least one management server 100 and a plurality of computing devices 110 (e.g., miners). Each computing device 110 comprises a CPU or controller 160, one or more processing or hash boards 150 each having one or more specialized processor chips 170 such as ASICs or GPUs, one or more cooling fans 140, and one or more power supplies 180. Each computing device 110 may further comprise a network interface configured to enable computing device 110 to communicate with management server 100 via network 102. Network 102 may for example be a LAN or WAN such as the Internet.

In one embodiment, CPU/controller 160 is configured to receive jobs from server 100 via network 102 and then distribute them to the ASICs/GPUs 170 on processing/hash boards 150. Results from ASICs/GPUs 170 that meet a specified minimum difficulty are passed to pool management application 130 executing on server 100 by controller 160 after being signed by the computing device's private key.

Server 100 may comprise one or more processors 120, a data storage device 124, and a network interface 122 configured to enable communication between server 100 and other devices including computing devices 110 and other participants in the blockchain network. Server 100 may be configured to execute a pool management application 130 that comprises a number of different modules that, when executed by processor 120, perform operations that manage computing devices 110 in their work for the blockchain network. For example, account module 132 is configured to interact with users so that they can create pool accounts. This includes for example setting users names and passwords, contact information, managing the accounts in which rewards from the pool should be deposited (e.g., wallet addresses), and receiving a public key for each computing device 110. Interaction by the user/owner of computing device 110 with account module 132 is preferably via an encrypted secure connection (e.g., SSL/TLS).

Pool management application 130 may also include a job dispatch module 134 that when executed causes jobs to be dispatched to computing devices 110 via network 102. The jobs may for example include information to be hashed, a target difficulty, and one or more starting nonce values. Upon receiving the jobs, computing devices 110 may be configured to begin calculating hashes for the received information. If the resulting hash does not meet the specified minimum difficulty, the computing device 110 may be configured to repeatedly increment the one or more nonces and then continue hashing. If the resulting hash meets the specified minimum difficulty, the computing device 110 may be configured to sign the results with a private key and send them to the pool management application 130 on server 100 via network 102.

In response to receiving a signed result from computing devices 110, pool management application 130 may be configured to check the signature by executing signature checking module 138. Signature checking module 136 may be configured to lookup the public signature for the submitting computing device 110 (e.g., from data storage 124 or network 102) and use it to check the signature of the signed results. If the signature indicates that the results did indeed come from the corresponding computing device 110 and that the results were not tampered with, then pool management application 130 may be configured to pass the results to share checking module 138 which when executed is configured to confirm that the nonce(s) provided by the computing device 110 is/are valid, e.g., meet the minimum difficulty requirement specified by the pool management application 130. If the results meet the blockchain network's current difficulty and have not been rendered moot by a prior solution, share checking module 138 may be configured to send the results as a solved block to the blockchain network via network 102. The pool management application 130 may then be configured to invoke rewards module 139 to allocate the rewards to the user accounts from computing devices 110 in accordance with a reward distribution algorithm that users/owners of computing devices 110 agreed to as part of the pool signup and device registration process. For example, reward distribution algorithms implemented by rewards module 139 may include payment per share based on difficulty or payment per last N shares based on difficulty, but other algorithms are possible and contemplated. For example, a greater share of rewards may for example be allocated to the computing device 110 that submitted the winning share (i.e., rewarding good luck).

Pool management application 130 is preferably implemented in software (e.g., instructions stored on a non-volatile storage medium such as a hard disk, flash drive, or DVD-ROM), but hardware implementations are also possible. Software implementations of management application 130 may be written in one or more programming languages or combinations thereof, including low-level or high-level languages, with examples including Java, Ruby, JavaScript, Python, C, C++, C #, or Rust. The program code may execute entirely on one or more servers 100 as a stand-alone software package, or partly on server 100 and partly on a user's computer or device or a remote computer. In the latter scenario, the remote computer may be connected to server 100 through network 102 or a different network, including a local area network (LAN) or a wide area network (WAN), or the connection may be made to an external computer (for example, through the Internet using an Internet service provider). Alternatively, the functions of the pool management application 130 or one or more modules 132-139 may be implemented in whole or in part by integrated circuits (e.g., FPGAs) or other hardware (not shown).

Figure 2:
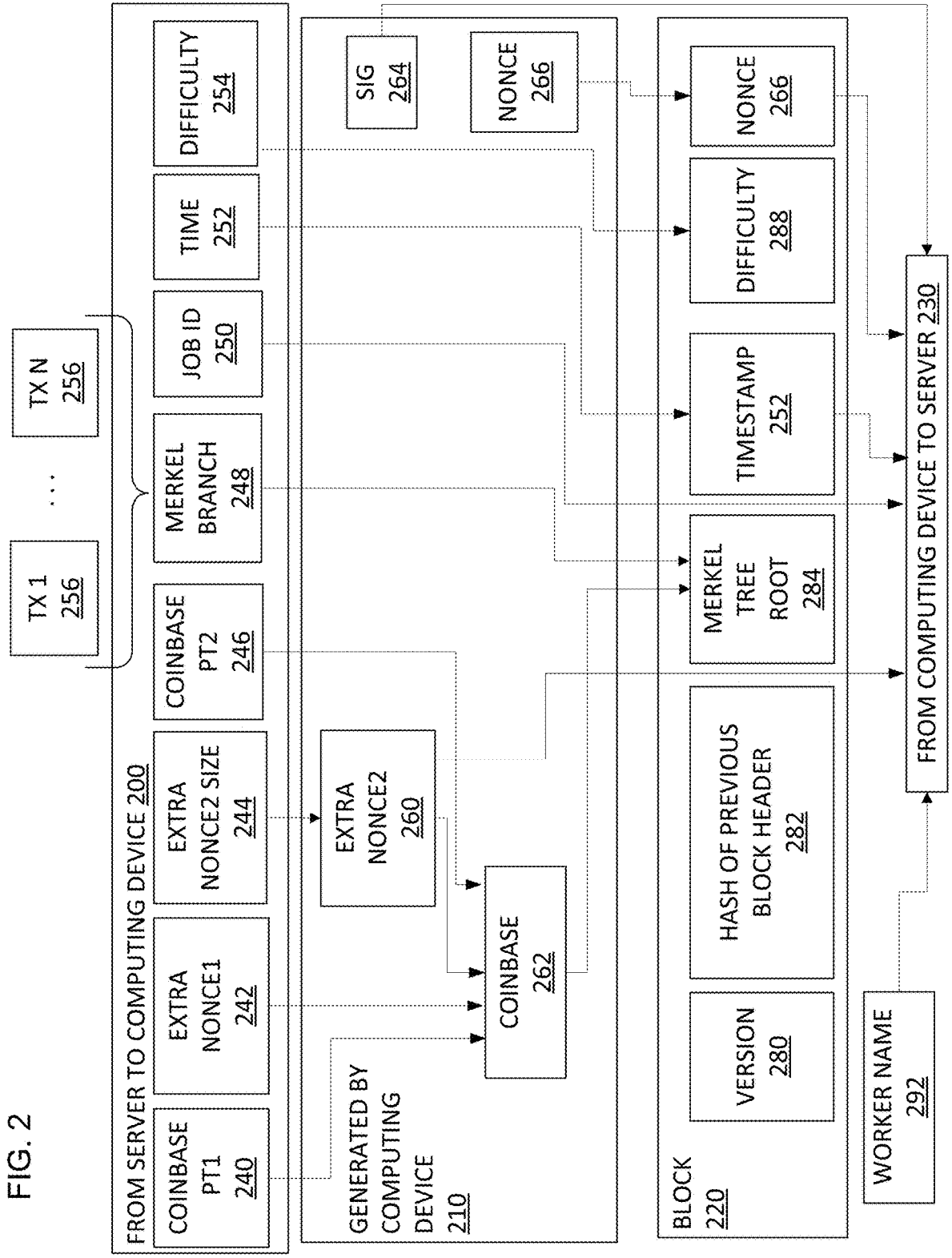
FIG. 2 is a diagram illustrating one example of a block in a proof of work system according to the teachings of the present disclosure.

Turning now to FIG. 2, an illustration of one example embodiment of a data flow diagram is shown. Data items 200 are data provided to computing devices 110 from server 100. In this embodiment, portions of data items 200 may be formatted according to the Stratum mining protocol. Data items 200 may include a first portion of a coinbase transaction 240, a first extra nonce 242, a size (i.e., number of bits) 244 for a second extra nonce, a second portion of a coinbase transaction 246, a Merkel branch 248 formed by hashing one or more transactions 256, a Job ID 250, a timestamp 252, and a difficulty value 254. Data items 200 are provided to computing devices 110 as part of providing jobs for computing devices 110 to work on. In response, computing device 110 is configured to generate a second extra nonce 260 and combine that with the first portion of a coinbase transaction 240, the first extra nonce 242, and the second portion of the coinbase transaction 246 in order to form a complete coinbase transaction 262. Coinbase transaction 262 is then combined with the Merkel branch 248 received from server 100 to form Merkel tree root 284. Coinbase transaction 262 includes information such as the wallet where the reward for solving the block should be deposited.

Computing device 110 calculates hashes for block 220 by iterating through the possible values of nonce 266. The calculated hashes are checked to see if they match the desired difficulty 254 (e.g., by beginning or ending with a specified number of zeros) specified by the server 100. Once computing device 110 has checked all possible values of nonce 266, computing device 110 may increment the second extra nonce 260 and then start over checking possible values of nonce 266. Any hashes that satisfy the specified difficult 254 are conveyed to server 100.

In one embodiment, the solutions are conveyed by providing selected information 230 to the server 100, including for example the compute device's worker name 292 (typically established as part of the miner setup or subscription/authorization process), the second extra nonce 260, the job ID 250, the timestamp 286, and the nonce 266.

If the pool is the first to determine a hash that satisfies the blockchain's current specified difficulty, the pool submits the block 220 to the blockchain and receives a reward that the pool then distributes to pool members according to the pool's specified reward sharing algorithm. Block 220 may for example comprise a version field 280, a hash of the previous block's header 282, a Merkel tree root for the transaction or transactions 256 being included in the block 220, a timestamp 252, a difficulty value 288, and a nonce 266.

Figure 3:
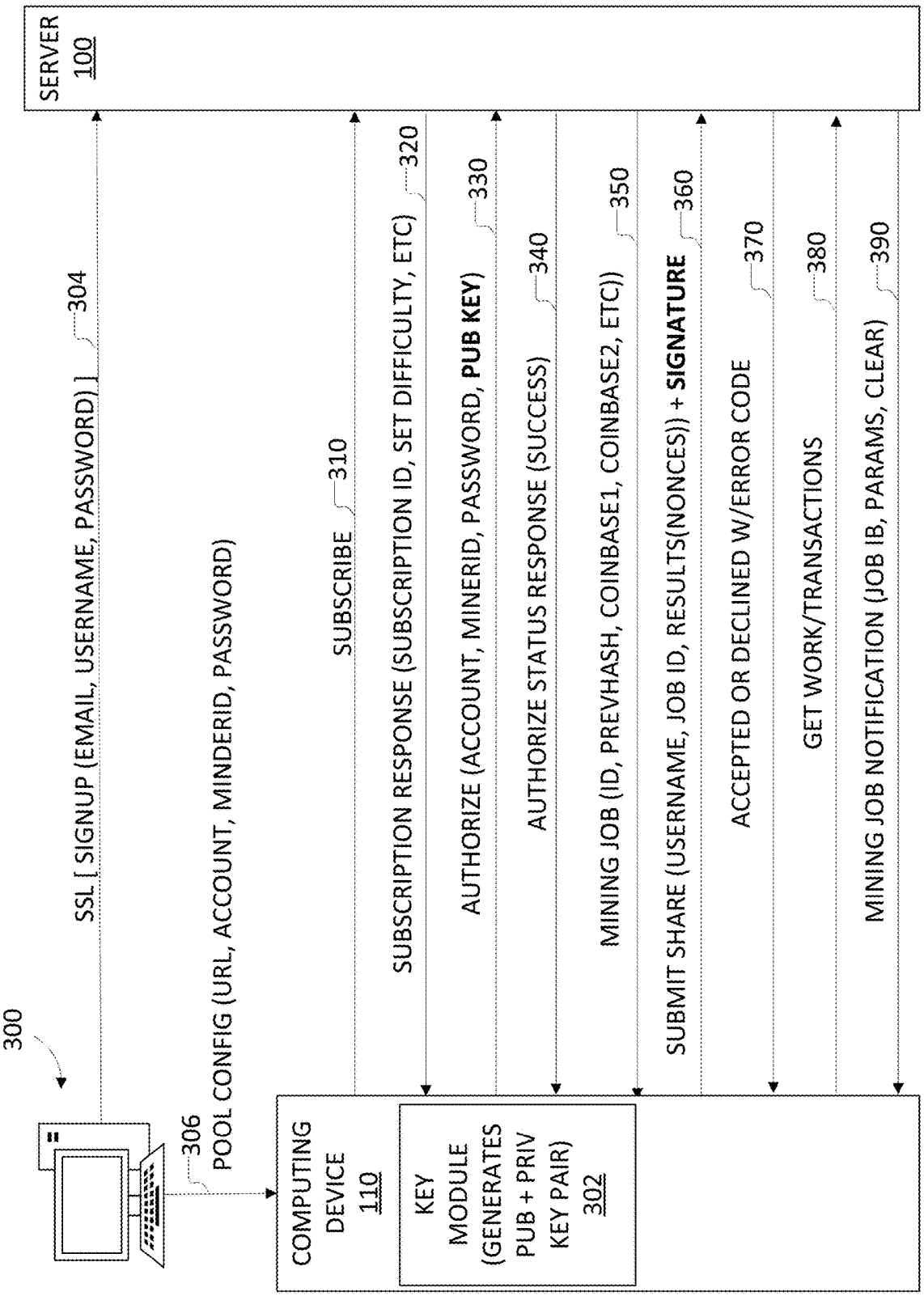
FIG. 3 is a diagram illustrating one example of a method of communication in a proof of work system according to the teachings of the present disclosure.

Turning now to FIG. 3, an illustration of one example embodiment of a system for operating a mining pool is shown. The system comprises one or more computing devices 110 and one or more pool management servers 100. Computer 300 is used to create an account and sign up to participate in the pool being managed by server 100. As part of the sign-up process, a secure connection (e.g., SSL) is negotiated between computer 300 and server 100, and a signup message 304 is communicated, including an email address, username, and password. Other additional information may be required by server 100 and communicated by computer 300, for example a phone number capable of receiving SMS messages for two-factor authentication and an account address for the pool to deposit earned rewards into.

Once the pool account has been created, the pool participant may use that information to configure the user's computing devices 110 that will be participating in the pool. As part of the configuration process, configuration information 306 may be sent from computer 300 to one or more computing devices 110. Configuration information may comprise, for example, a URL or IP address and port number combination that computing device 110 may use to communicate with the pool, an account id, a miner id (to differentiate between multiple computing devices 110 that are mining on the same account), and a password (which may be needed for security purposes in order to update the computing device's settings). In some embodiments configuration information 306 may be communicated to computing device 110 via SSH connection or SSL via computing device 110's web interface.

Once configured and ready to mine, computing device 110 may be configured to send a subscription message 310 to the pool managed by server 100. In response, server 100 may send a subscription response message 320 to computing device 110. In one embodiment, subscription response message 320 may comprise a subscription ID, and additional information such as a minimum difficulty (i.e., a difficulty below which the pool will not accept completed work or "shares"). In response, computing device 110 may respond with an authorization message 330 which may comprise the computing device's configured account ID, miner ID, password and a public key. The public key may be generated by a key module configured to generate public and private key pairs for computing device 110. In some embodiments the key module may execute on computing device 110, in other embodiments it may execute on computer 300, with the keys being provided to computing device 110 with the pool configuration information 306.

In response to the authorization request message 330, server 100 may be configured to respond with an authorization status response message 340, indicating either success or failure. If success is indicated, server 100 may follow up with a mining job 350. This may include a job ID and information required or helpful for computing device 110 to perform the request job. For example, this may include the hash of the previous block, one or more parts of the coinbase transaction for the current block being mined, and a nonce to start from.

In response to receiving the work/job, computing device 110 may be configured to begin the job, e.g., beginning calculating hashes and iterating through nonces in the assigned range. In the event that computing device 110 finds a hash/solution that meets the minimum difficulty specified by the pool, a submit share message 360 may be sent. The submit share message 360 may include information such as the username, job ID, and the nonce or nonces that resulted in the solution that met the specified minimum difficulty. Computing device 110 may be configured to cryptographically sign the submit share message 360 with a private key corresponding to the public key that was provided to server 100 earlier as part of the authorize message 330.

Server 100 may be configured to check the signature of any received submit share messages that are signed to confirm the provenance of the share being submitted. Beneficially, if the signature corresponds to computing device 110's previously submitted public key, server 100 will know that the share validly came from computing device 110. Conversely, if the signature is missing or does not correspond to computing device 110's previously submitted public key, server 100 will know that the share was tampered with (in the event of a malformed signature) or that the share is of unknown provenance (in the event of no signature).

Server 100 may be configured to respond with an accepted or rejected/declined share message 370. In the event of a rejected/declined share, server 100 may provide an error code to indicate why the share was rejected (e.g., invalid or missing signature).

Computing device 110 may be configured to request additional jobs via a get work message 380, and server 100 may be configured to respond, or send of it is own accord (e.g., when the current block is solved) a new mining job notification message 390. Mining job notification message 390 may include a job ID, additional parameters that computing device 110 may require to perform the job, and also an optional indicator of whether or not to clear the computing device's current job queue and start immediately on the new job.

In some embodiments, a secure network connection (e.g., SSL/TLS) may be use for one or more of the communications between the computing device 110 and server 100. For example, the authentication message 330 may be communicated over the secure network connection.

Figure 4:
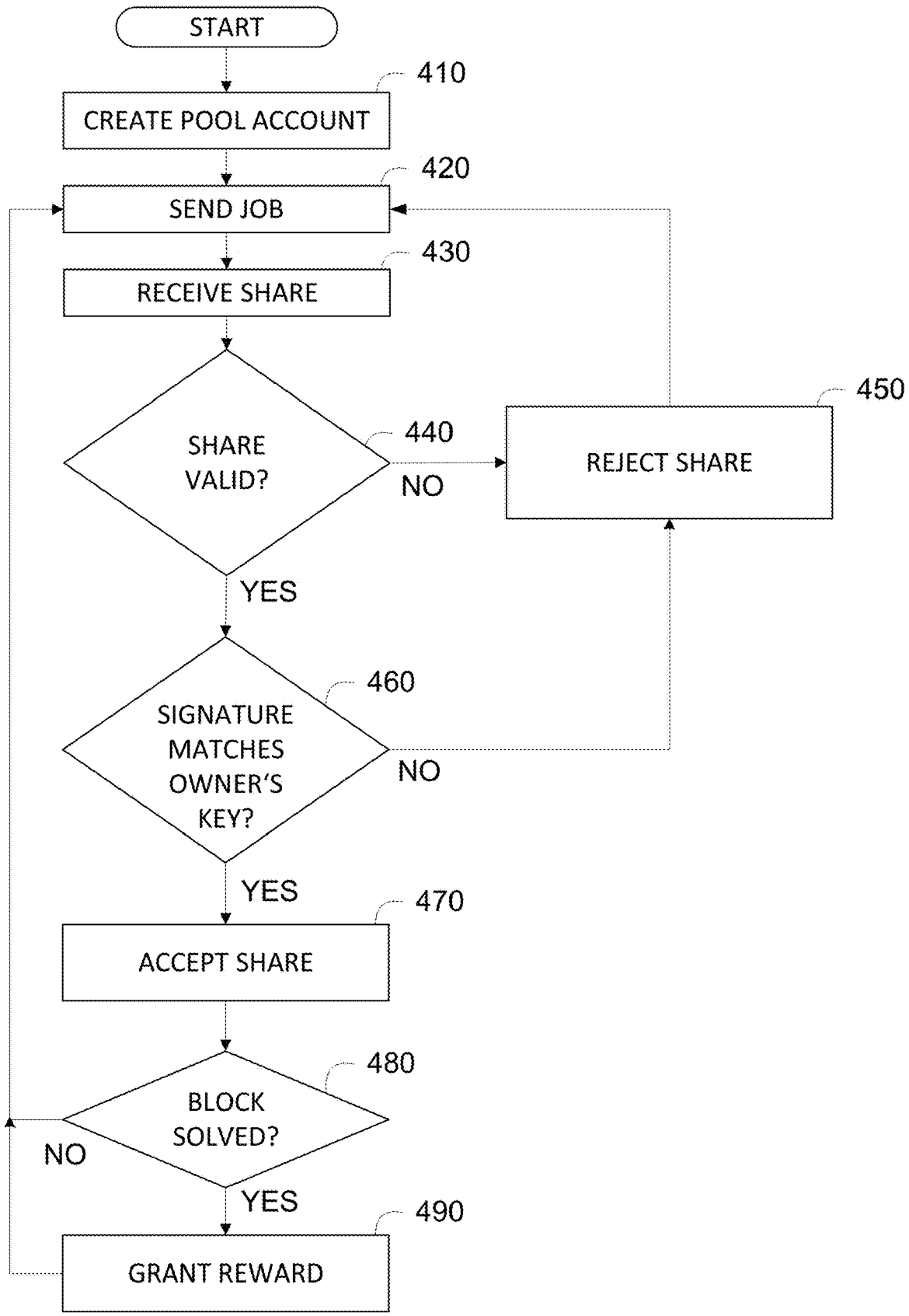
FIG. 4 is a flow chart of an example embodiment of a method for operating a distributed computing pool according to the teachings of the present disclosure.

Turning now to FIG. 4, a flowchart illustrating one example embodiment of a method for operating a computing pool is shown. In this embodiment, a pool account is created (step 410) and a job is sent to the computing device (step 420). When a share is received from the computing device (step 430), the share is validated (step 440). If the share is not valid (e.g., below the required difficulty or for a block that has already been solved), the share is rejected (step 450). If the share is valid, the signature may be checked to confirm whether the signature matches the public key of the computing device or account corresponding to the received share (step 460). If not, the share is rejected (step 450). If the signature matches, the share is accepted (step 470). The process is repeated until a block is solved (step 480), at which point the reward earned is distributed to the pool members (step 490), e.g., in proportion to their accepted shares based on difficulty (i.e., more rewards allocated to high difficulty shares submitted).

Figure 5:
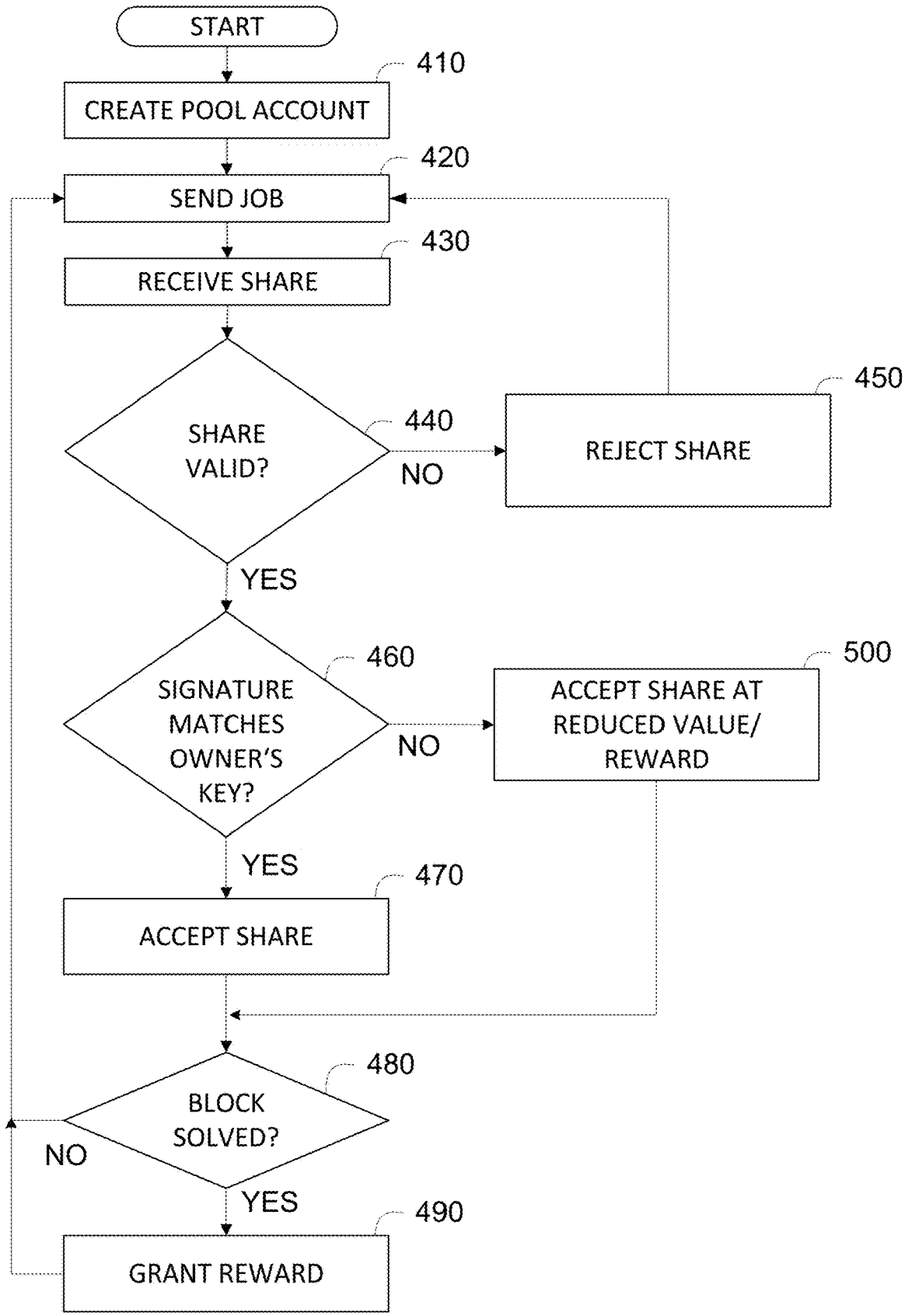
FIG. 5 is a flow chart of another example embodiment of a method for operating a distributed computing pool according to the teachings of the present disclosure.

Turning now to FIG. 5, a flowchart illustrating another example embodiment of a method for operating a computing pool is shown. In this embodiment, if a valid share is received that does not have a valid signature (step 460), the share may still be accepted (step 500), but at a reduced value (e.g., 75% or 50% of the value of a share with a proper signature). These accepted but unsigned shares may be discounted when a block is solved (step 480) and rewards are allocated (step 460).

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such elements. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." and "for example" in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/ or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for participating in a computing pool that combines computational resources over a network, the method comprising:
   authenticating a computing device by sending a username, a password, and a public key from the computing device to the pool via the network, wherein the public key corresponds to a private key associated with the computing device;
   sending a connection request from the computing device to the pool;
   receiving at the computing device a response to the connection request from the pool, wherein the response comprises a job;
   executing the job on the computing device to calculate a solution;
   signing the solution on the computing device with a signature based on the private key;
   sending the signed solution from the computing device to the pool;
   receiving a reward from the pool in response to submitting the signed solution if the signature of the signed solution is verified;
   authenticating a second computing device by sending a second username and a second password from the second computing device to the pool via the network;
   sending a second connection request from the second computing device to the pool;
   receiving at the second computing device a second response to the second connection request from the pool, wherein the second response comprises a second job;
   executing the second job on the second computing device to calculate a second solution;
   sending the second solution in unsigned form from the second computing device to the pool; and
   receiving a reduced reward from the pool in response if the unsigned second solution is valid and the pool is first to solve a blockchain block corresponding to the second solution.

2. The method of claim 1, further comprising creating an SSL/TLS connection from the computing device to the pool.

3. The method of claim 1, wherein the reward is received from the pool in response to submitting the signed solution if (i) the signature of the signed solution is verified, (ii) the signed solution is valid, and (iii) the pool is first to solve a blockchain block.

4. The method of claim 1, further comprising receiving at a third computing device a share rejected notification from the pool in response to submitting an unsigned third solution to the pool.

5. A method for operating a computing pool, the method comprising:
   receiving a connection request from a computing device to a pool;
   responding to the connection request by sending a job to the computing device;
   waiting for the computing device to execute the job and respond with a solution signed by a private key;
   verifying the signature of the solution with a public key;
   verifying the solution;
   granting a first reward to the computing device if the signature is properly verified;
   rejecting solutions that are not properly verified;
   determining whether the solution is a block;
   submitting the solution to a blockchain node;
   receiving a username and a password from a second computing device via a network to authenticate the second computing device;
   receiving a second connection request from the second computing device to the pool;
   responding to the second connection request by sending a second job to the second computing device;
   waiting for the second computing device to execute the second job and respond with a second solution;
   receiving the second solution in unsigned form from the second computing device to the pool; and
   granting a reduced reward from the pool to the second computing device if the unsigned second solution is verified and the pool is first to solve a blockchain block corresponding to the second solution.

6. The method of claim 5, further comprising creating an SSL/TLS connection from the computing device to the pool.

7. The method of claim 5, further comprising granting a reward to the computing device for signed solutions that are verified if the signature of the signed solution is verified and the pool is first to solve a current blockchain block.

8. The method of claim 7, wherein the reward is proportional to the number of shares and share difficulty submitted by the computing device for the current blockchain block.

9. The method of claim 7, wherein the reward is proportional to the number of shares and share difficulty submitted out of the last N verified shares received by the pool.

10. The method of claim 7, further comprising:
receiving an unsigned third solution from a third computing device;
verifying the unsigned third solution; and
refraining from granting any reward to the third computing device for the unsigned third solution.

11. The method of claim 7, further comprising:
receiving an unsigned third solution from a third computing device;
rejecting the unsigned third solution before performing any verification; and
refraining from granting any reward to the third computing device for the rejected unsigned third solution.

12. A method for operating a computing pool, the method comprising:
operating a computing pool management application on a server;
in response to receiving at the server a connection request from a computing device attempting to connect to the pool, responding by sending a job from the server to the computing device;
waiting for the computing device to execute the job and respond with a solution;
signing the solution on the computing device with a private key;
sending the signed solution from the computing device to the pool;
in response to receiving the solution to the job from the computing device, verifying the correctness of the solution;
verifying a signature of the solution with a public key;
allocating a share of any rewards the pool receives for the job to the computing device if the solution is correct and the signature is properly verified;
receiving a username and a password from a second computing device via a network to authenticate the second computing device;
receiving a second connection request from the second computing device to the pool;
responding to the second connection request by sending a second job from the server to the second computing device;
waiting for the second computing device to execute the second job and respond with a second solution;
receiving the second solution in unsigned form from the second computing device; and
granting a reduced share of the rewards the pool receives to the second computing device if the unsigned second solution is verified and the pool is first to solve a blockchain block corresponding to the second solution.

13. The method of claim 12, further comprising:
not allocating any share of the rewards the pool receives in response to solutions without verified signatures.

14. The method of claim 12, further comprising:
allocating a reduced share of the rewards the pool receives in response to valid solutions without verified signatures.

15. The method of claim 5, wherein verifying the signature includes comparing the private key to the public key.

16. The method of claim 15, wherein verifying the signature includes:
determining that the signature is valid when the private key matches or corresponds to the public key; and
determining that the signature is invalid when the private key does not match or correspond to the public key.

17. The method of claim 5, wherein verifying the signature includes:
looking up the public key of the computing device on a data store or network; and
comparing the private key to the public key.

* * * * *